United States Patent [19]

Brazener

[11] Patent Number: 4,507,959
[45] Date of Patent: Apr. 2, 1985

[54] AIRCRAFT INSTRUMENTS

[75] Inventor: David J. Brazener, Cheltenham, England

[73] Assignee: Smiths Industries Public Limited Company, London, England

[21] Appl. No.: 440,159

[22] Filed: Nov. 8, 1982

[30] Foreign Application Priority Data

Nov. 24, 1981 [GB] United Kingdom ............... 8135358

[51] Int. Cl.³ .............................................. G01P 5/16
[52] U.S. Cl. ..................................... 73/182; 116/290
[58] Field of Search .................... 73/182, 386, 387; 116/290

[56] References Cited

U.S. PATENT DOCUMENTS

| | | | |
|---|---|---|---|
| 2,537,240 | 1/1951 | Shaw | 73/182 |
| 2,706,407 | 4/1955 | Hosford | 73/182 |
| 3,112,644 | 12/1963 | Schroeder | 73/182 |
| 3,205,708 | 9/1965 | Andresen | 73/182 |
| 3,257,845 | 6/1966 | Andresen | 73/182 |
| 3,376,743 | 4/1968 | Caggia | 73/182 |
| 3,435,675 | 4/1969 | Knapp | 73/182 |
| 3,465,583 | 9/1969 | Molis | 73/182 |
| 3,522,730 | 8/1970 | Knapp | 73/182 |
| 4,081,730 | 3/1978 | Murtland | 73/182 |

Primary Examiner—Steven L. Stephan
Assistant Examiner—Denis E. Corr
Attorney, Agent, or Firm—Pollock, Vande Sande and Priddy

[57] ABSTRACT

A Mach airspeed indicator instrument has a pointer that is rotatable around an airspeed scale and a Mach scale, the Mach scale itself being rotated in response to altitude change. A marker can be rotated around the scales via a cam that is manually rotated by an external knob. Rotation of the Mach scale is coupled via two vertical links and a lateral arm to rotate a gear ring which carries a peg. When the gear ring reaches a certain position the peg contacts and displaces a similar peg which rotates the marker with the Mach scale. The Mach value at which this occurs is adjusted manually from outside the instrument by a knob. Twisting the knob causes a vertical displacement of a mounting bracket on which the lateral arm is pivotted. The lateral arm is fixed at the end coupled with the Mach scale so that it rotates about that end causing rotation of the gear ring without affecting the Mach scale.

7 Claims, 4 Drawing Figures

AIRCRAFT INSTRUMENTS

BACKGROUND OF THE INVENTION

This invention relates to aircraft instruments.

Airspeed indicators have a pointer that is moved over a scale calibrated in knots in accordance with the airspeed of the aircraft. Such indicators on high-speed aircraft can also have a separate scale calibrated in Mach number so that this value can readily be ascertained. Mach number, however, is not directly related to airspeed but is also dependent on ambient pressure and hence, altitude. The Mach number scale is therefore usually provided on a moveable dial that is rotated in accordance with the altitude of the aircraft so as to compensate for this effect. Instruments of this kind commonly have a marker that is set against the highest desired airspeed and Mach number at which the aircraft should be flown, so that the pilot can readily determine when he is exceeding or approaching this speed. The maximum speed is dependent upon the ability of the aircraft to withstand the strain and forces exerted on it, and has been found to be more closely related to Mach number than actual airspeed, especially at higher altitudes. Accordingly, Mach airspeed indicators usually have a maximum speed marker that is set against a fixed value of airspeed in knots, below a certain altitude, and is then rotated together with the Mach scale as altitude changes at greater heights. In this way, at high altitudes, the marker moves against the airspeed/knots scale upon change in altitude. Various gearing arrangements to achieve this modification at higher altitudes have been used. While it has been relatively simple to modify the setting of the maximum speed marker against the airspeed scale, from the exterior of the instrument case, it has been considerably more difficult to set the value at which the marker will be taken up by the Mach scale and set against a constant Mach number. In the past this has had to be done by an engineer, by opening the instrument case and appropriately modifying the mechanism. In many cases it is desired to be able readily to change also the maximum Mach number setting for different circumstances, such as, for example, reducing the Mach number when the aircraft is being flown by an inexperienced pilot.

BRIEF SUMMARY OF THE INVENTION

It is an object of the present invention to provide an airspeed indicator in which the maximum Mach number setting can be readily adjusted.

According to one aspect of the present invention there is provided an instrument having one or more indicator members moveable along first and second scales in accordance with a first input variable, said second scale being moveable with respect to said first scale in accordance with a second input variable, said instrument including marker means that is settable manually along at least said second scale to represent a reference value against which the or each said indicator member is moveable, said marker means having a first engagement member fixed therewith such that the disposition of said marker means changes with change in disposition of said first engagement member, said second scale having a second engagement member coupled therewith that is displaced in accordance with displacement of said second scale, said first and second engagement members being arranged to contact one another when said marker means and said second scale are at a predetermined relative disposition, and the disposition of said second engagement member relative to said second scale being readily adjustable manually so as to alter the relative disposition of said first and second engagement members.

In this way it is possible readily to adjust the value at which the marker means will be displaced with the second scale.

The indicator member, the second scale and said marker means may be rotatable about a common axis. The first input variable may be airspeed, said first scale being calibrated in airspeed, and the second input variable may be atmospheric pressure, said second scale being calibrated in Mach number. The first and second engagement members may be mounted respectively with first and second rotatable members that are axially aligned with one another such that relative rotation between the rotatable members causes said engagement members to contact one another. The instrument may include a mechanical linkage one end of which is coupled with said second engagement member and the other end of which is coupled with said second scale, the mechanical linkage being arranged such that said one end can be displaced without displacing the said other end.

According to another aspect of the present invention there is provided a Mach airspeed indicator instrument including an airspeed scale; a Mach number scale, said Mach number scale being displaceable relative to the airspeed scale in accordance with change in atmospheric pressure; an indicator member that is rotatable around the airspeed scale and the Mach number scale; and marker means that is settable at a position around said airspeed or Mach number scale in accordance with a maximum desired speed, said marker means having a first engagement member fixed therewith that is displaced upon rotation of said marker means, said Mach number scale having associated therewith a second engagement member that is coupled with said Mach number scale by mechanical linkage means, said first and second engagement members being arranged to contact one another on rotation of said Mach number scale through more than a predetermined angle thereby to cause rotation of said marker means with said Mach number scale, and said linkage being adjustable manually such as to displace said second engagement member relative to said first engagement member, without causing displacement of said Mach number scale.

The mechanical linkage may include two links extending substantially parallel to one another and connected to said second engagement member and to the displaceable scale respectively, said two links being interconnected by a transverse arm pivotally connected with said links. The transverse arm may be pivotally mounted intermediate its ends with a mounting member, said mounting member being manually displaceable in a direction substantially parallel to said two links. Said mounting member may be mounted on a screw member that can be manually rotated. Opposite ends of said mechanical linkage may be coupled to respective gear means. The instrument may include cam means coupled with said marker means such that manual rotation of said cam effects displacement of said marker means.

A Mach airspeed indicator instrument will now be described, by way of example, with reference to the accompanying drawings.

DETAILED DESCRIPTION

Figure 1:
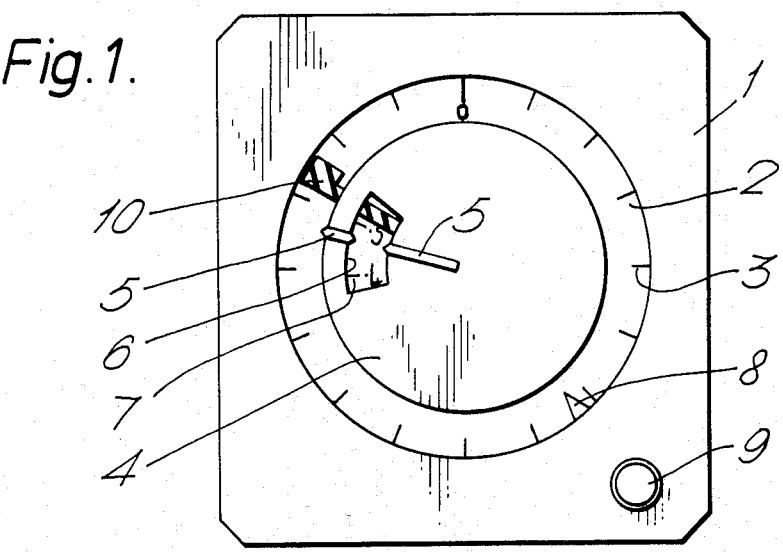
FIG. 1 shows the front face of the instrument.

With reference to FIG. 1, it can be seen that the front face 1 of the airspeed indicator instrument is provided with a circular panel 2 in which the various items of airspeed information are presented. Around the outer edge of the panel 2 is printed a fixed circular scale 3 calibrated in knots. A disc 4 carrying a radially extending pointer 5 is rotatable about its center to cause movement of the pointer 5 along the airspeed scale 3. Close to its edge, the disc 4 is formed with a window 6 through which is visible a second scale 7 calibrated in Mach number and that is moveable, as described later. The window 6 interrupts the pointer 5 so that the Mach number can be read between the gap in the pointer. A marker 8 of triangular shape is moveable manually around the outer edge of the airspeed scale 3 by means of a rotatable knob 9 on the front face of the instrument. The marker 8 is set by the pilot to indicate any desired reference speed.

A second marker 10 represents the maximum speed at which aircraft should be flown. This maximum speed marker 10 is located over the airspeed and Mach number scales 3 and 7 and is set to the maximum desired speed by means of a rotatable knob 47 (FIG. 4) at the rear of the instrument.

Figure 2:
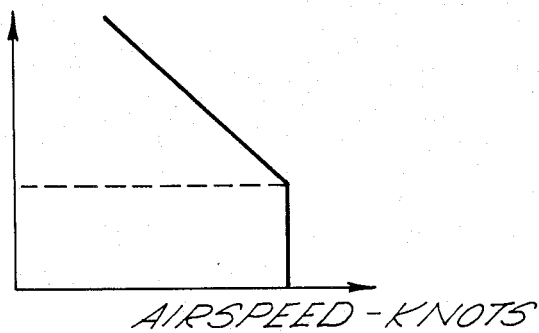
FIGS. 2 and 3 illustrate the behavior of the instrument with change in altitude.
Figure 3:
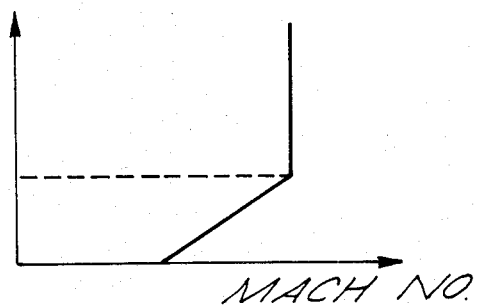

The Mach number at which an aircraft is flying depends not only on its airspeed but also on its altitude (since the speed of sound varies with pressure). The Mach number scale 7 is accordingly rotated with change in atmospheric pressure, as the aircraft changes height, so as to compensate for this. The maximum speed marker 10 is arranged such that, below a set altitude, it remains stationary relative to the airspeed scale 3 but will indicate a progressively higher Mach number as the aircraft altitude increases up to this set altitude. At higher altitudes, the indicator is arranged such that the maximum speed marker 10 is rotated together with any rotation of the Mach number scale 7, so that a constant maximum Mach number is indicated, and a progressively lower airspeed. The movement of the maximum speed marker 10 relative to the airspeed scale 3 and the Mach number scale 7 is shown respectively in FIGS. 2 and 3.

Figure 4:
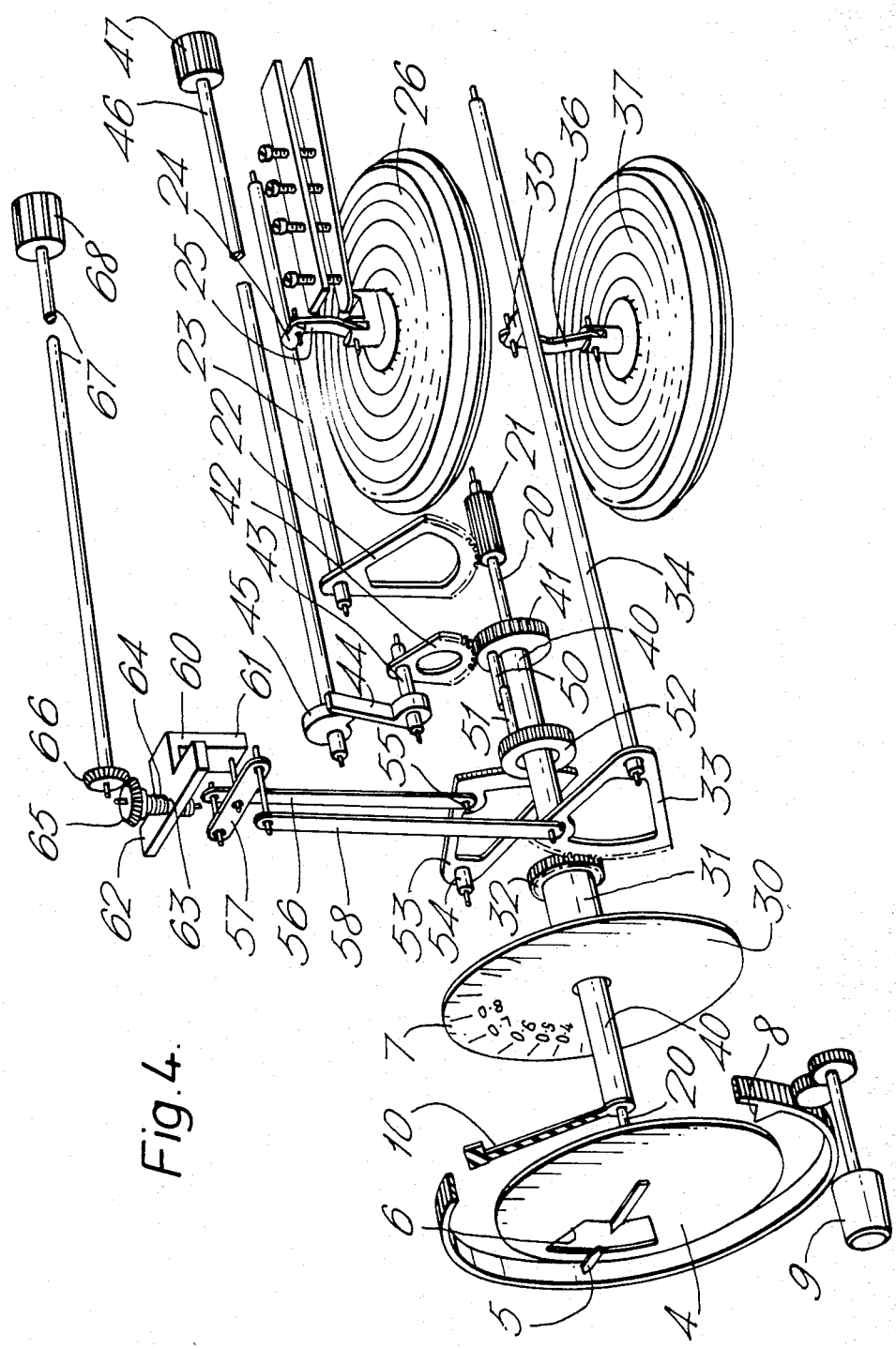
FIG. 4 is a schematic perspective view of the interior of the instrument.

The construction of the indicator will now be described in detail with reference to FIG. 4 from which the operation of the indicator will become clear. The airspeed disc 4 is fixed to a horizontal spindle 20 that is rotatable about its axis. The spindle 20 extends rearwardly of the indicator and is terminated by a toothed drum gear 21. The drum gear 21 meshes with a segment gear 22 that is fixed at its apex to a shaft 23 that is rotatably mounted at its ends. Midway along the shaft 23 there is secured a radially extending finger 24 that is coupled, via a linkage 25, to the center of a pressure capsule 26. The capsule is connected with the aircraft pitot probe such that the capsule 26 is deflected by pressure change caused by change in airspeed. Deflection of the capsule 26 causes the shaft 23 to rock about its axis, and the segment gear 22 to rotate. This rotation is communicated via the spindle 20 to cause rotation of the disc 4 and pointer 5 around the airspeed scale 3 and Mach number scale 7.

The Mach number scale 7, which appears in the window 6, is printed around the front surface of a rotatable plate 30. The Mach scale plate 30 is mounted concentrically with the spindle 20 on a short cylindrical sleeve 31 through which the spindle extends. At the rear end of the sleeve 31 there is mounted a gear ring 32 that meshes with a second segment gear 33. The segment gear 33 is fixed at its apex to a horizontal shaft 34 that is rotatably mounted at both ends. Midway along the shaft 34 there is secured a radially extending finger 35 that is coupled, via a linkage 36, to the center of a second pressure capsule 37. The pressure capsule 37 receives atmospheric pressure from outside the aircraft so that it is deflected in accordance with change in aircraft altitude. Deflection of the capsule 37 causes the altitude shaft 34 to rock about its axis and the segment gear 33 to rotate. This causes a corresponding rotation of the Mach scale plate 30.

The maximum speed marker 10 is distinctively patterned, such as, with red and white diagonal stripes, so as to be readily visible to the pilot. The marker 10 projects radially from a central tubular shaft 40 that extends rearwardly of the instrument. The tubular shaft 40 passes coaxially through the sleeve 31 of the Mach scale plate 30 and around the airspeed pointer spindle 20, terminating forwardly of the spindle drum gear 21. A first rotatable member in the form of a gear wheel 41 is fixed with the rear end of the maximum speed marker shaft 40 and this meshes with a small sector gear 42. The apex of the sector gear 42 is mounted towards one end of a journalled stub 43 extending parallel to the shaft 40. At the other end of the stub 43 there is carried a radially-extending lever 44 the surface of which abuts a cam wheel 45. The cam wheel 45 is mounted at the forward end of a setting shaft 46 the rear end of which projects out the rear of the indictaor housing and has the setting knob 47 mounted thereon. The marker 10 is urged anticlockwise by a hairspring or other means (not shown) so that the lever 44 is maintained in contact with the cam 45. It will be seen that rotation of the setting knob 47 causes a corresponding rotation of the cam 45, lever 44 and sector gear 42. This thereby moves the maximum speed marker 10 around the airspeed scale 3.

Projecting forwardly from the maximum speed marker shaft gear wheel 41 there is a first engagement member in the form of a short peg 50 that extends parallel to the shaft 40. A second engagement member in the form of a similar peg 51 extends rearwardly from a second rotatable member in the form of a gear ring 52 that is rotatably mounted on the shaft 40 forwardly of the gear wheel 41. The two pegs 50 and 51 overlap one another along their length so that, on relative rotation of the gear wheel 41 and gear ring 52 the two pegs can contact one another. The edge of the gear ring 52 meshes with a sector gear 53 that is freely pivotted at its apex 54. Close to its toothed edge, the sector gear 53 has a projecting pin 55 that engages with the lower end of a vertical link 56. The upper end of the vertical link 56 is pivotally connected with one end of a lateral arm 57 that is in turn pivotally mounted midway along its length. The other end of the lateral arm 57 is connected with the upper end of a second vertical link 58 the lower end of which is connected close to the toothed edge of the segment gear 33 by which the Mach scale plate 30 is rotated. Change in altitude, causing rotation of the segment gear 33, will therefore be communicated via the mechanical linkage comprising the two vertical links 58 and 56, and the arm 57, to rotate the gear ring 52. An increase in altitude, causing anticlockwise rotation of the Mach scale plate 30, will also therefore cause anticlockwise rotation (when viewed from the front of the instrument) of the gear ring 52.

The lateral arm 57 is pivotted on a bracket 60 that is fixed relative to the instrument casing. The bracket 60 has a vertical leg 61 to which the arm 57 is attached, the upper end of the leg being joined with a flat horizontal plate 62 of T-shape. The plate 62 has a screw-threaded aperture 63 which receives a screw member 64 by which the bracket 60 is supported with the instrument casing. The screw member 64 is formed with a crown gear 65 at its upper end that meshes with a bevel pinion 66 secured to the forward end of a horizontal shaft 67. At the rear end of the shaft 67 there is mounted a knurled knob 68 that is located externally of the indicator housing. Rotation of the knob 68 causes rotation of the screw member 64, thereby raising or lowering the bracket 60. The end of the lateral arm 57 connected with the Mach scale segment gear 33 is restrained against vertical movement such that raising or lowering the bracket 60 causes the arm 57 to pivot about this end. In this way, the other end of the lateral arm 57, that is, the end connected with segment gear 53, is displaced through about twice the distance moved by the bracket 60. Movement of the bracket 60 thereby causes rotation of the gear ring 52 and its peg 51 independently of any change in aircraft altitude.

In operation, the maximum speed marker 10 is set, by the knob 47, to the maximum desired airspeed in knots at which the aircraft should be flown. The other knob 68 is then used to set the maximum Mach number at which the aircraft should be flown. This does not move the marker 10 but instead displaces the peg 51 so as to alter the position at which the Mach scale plate 30 takes up the marker 10 and causes it to be moved with the Mach scale plate. On a typical flight the maximum speed marker 10 might be set to say 380 knots and 0.9 Mach. When the aircraft is stationary on the ground the marker 10 will therefore be positioned against 380 knots on the airspeed scale 3. As the aircraft flies faster and higher, the pointer 5 is rotated clockwise to indicate a higher airspeed and Mach number against the scales 3 and 7 respectively. The increase in altitude, however, causes the Mach plate 30 to rotate in an anticlockwise sense so that the indicated Mach number is higher than would otherwise be the case. The maximum airspeed in knots indicated by the marker 10 remains constant while the maximum Mach number increases with increasing altitude. Increasing altitude thereby causes the peg 51 on the gear ring 52 to be displaced anticlockwise about the shaft 40 until it contacts the peg 50 on the gear wheel 41. When this happens, the gear wheel 41 is also rotated anticlockwise in unison with the Mach scale plate 30 thereby causing the maximum speed marker 10 also to be rotated anticlockwise. The maximum indicated airspeed in knots therefore falls while the maximum Mach number remains constant.

It can be seen that the altitude at which the maximum speed marker 10 becomes driven by the Mach scale plate 30 can be readily adjusted without requiring access to the interior of the instrument. This considerably simplifies setting the instrument and reduces the risk of damage that might be caused by tampering with mechanism as in previous methods. The instrument has therefore particular advantages for use in training aircraft where the maximum speed at which the pilot should fly can be carefully graduated.

What I claim is:

1. An instrument having first and second scales, an indicator member mounted for movement along said first and second scales in accordance with a first input variable, said second scale being mounted for displacement with respect to said first scale in accordance with a second input variable, said instrument including: marker means that is settable manually along at least said second scale to represent a reference value against which said indicator member is movable, a first engagement member, means connecting said first engagement member with said marker means such that the disposition of said marker means changes with change in disposition of said first engagement member, a second engagement member, means coupling said second engagement member with said second scale such that said second engagement member is displaced in accordance with said second scale, said second engagement member being arranged to contact said first engagement member and thereby displace said marker means only for values of said second input variable beyond a predetermined value, said second engagement member being free for displacement without contacting said first engagement member for other values of said second input variable, manual adjustment means, and means coupling said manual adjustment means with said second engagement member such that the disposition of said second engagement member relative to said second scale is readily adjustable manually so as thereby to alter the relative disposition of said first and second engagement members and hence the said predetermined value beyond which movement of said second engagement member causes movement of said first engagement member, said manual adjustment means comprising a mechanical linkage, means coupling one end of said mechanical linkage with said second engagement member, means coupling the other end of said mechanical linkage with said second scale; said mechanical linkage including means for displacing the said one end without displacing the said other end, said mechanical linkage including two links, means coupling one of said links to said second engagement member and the other of said links to the displaceable scale, said two links extending substantially parallel to one another, a transverse arm, means pivotally connecting said arm with said links, a mounting member, means pivotally mounting said transverse arm intermediate its ends with said mounting member, and means mounting said mounting member for manual displacement in a direction substantially parallel to said two links.

2. An instrument according to claim 1, wherein said indicator member, said second scale and said marker means are rotatable about a common axis.

3. An instrument according to claim 1, wherein said first input variable is airspeed, and wherein said first scale is calibrated in airspeed.

4. An instrument according to claim 1, wherein said second input variable is atmospheric pressure, and wherein said second scale is calibrated in Mach number.

5. An instrument according to claim 1, including first and second rotatable members that are axially aligned with one another, and means mounting said first and second engagement members respectively with said first and second rotatable members with one of said engagement members overlapping the other of said engagement members axially so that relative rotation between said rotatable members thereby causes said first and second engagement members to contact one another.

6. A Mach airspeed indicator instrument including an airspeed scale; a Mach number scale; means mounting said Mach number scale for displacement relative to said airspeed scale in accordance with change in pressure; an indicator member; means mounting said indicator member for rotation around said airspeed scale and said Mach number scale; marker means; means mounting said marker means such that it can be set at a position around said airspeed or Mach number scale in accordance with a maximum desired speed; a first engagement member; means mounting said first engagement member with said marker means such that said marker means is displaced on rotation of said first engagement member; a second engagement member; and mechanical linkage means coupling said second engagement member with said Mach number scale such that said marker means is rotated with said Mach number scale, said second engagement member being free to rotate without contacting said first engagement member for rotation less than a predetermined angle, said second engagement member contacting said first engagement member after rotation through more than said predetermined angle thereby causing rotation of said marker means with said Mach number scale, said mechanical linkage means being manually adjustable such as to displace said second engagement member relative to said first engagement member without causing displacement of said Mach number scale, said mechanical linkage means including two links, means coupling one of said links to said second engagement member and the other of said links to the displaceable scale, said two links extending substantially parallel to one another, a transverse arm, means pivotally connecting said arm with said links, a mounting member, means pivotally mounting said transverse arm intermediate its ends with said mounting member, and means mounting said mounting member for manual displacement in a direction substantially parallel to said two links.

7. An instrument according to claim 1 or claim 6, wherein said means mounting said mounting member is a screw member that can be manually rotated so as to displace said mounting member in a direction substantially parallel to said two links.

* * * * *